Feb. 5, 1935. J. S. SYLVESTER, JR., ET AL 1,990,354
SPEED CONTROL SYSTEM FOR AUTOMOBILES
Filed May 10, 1933 3 Sheets-Sheet 1
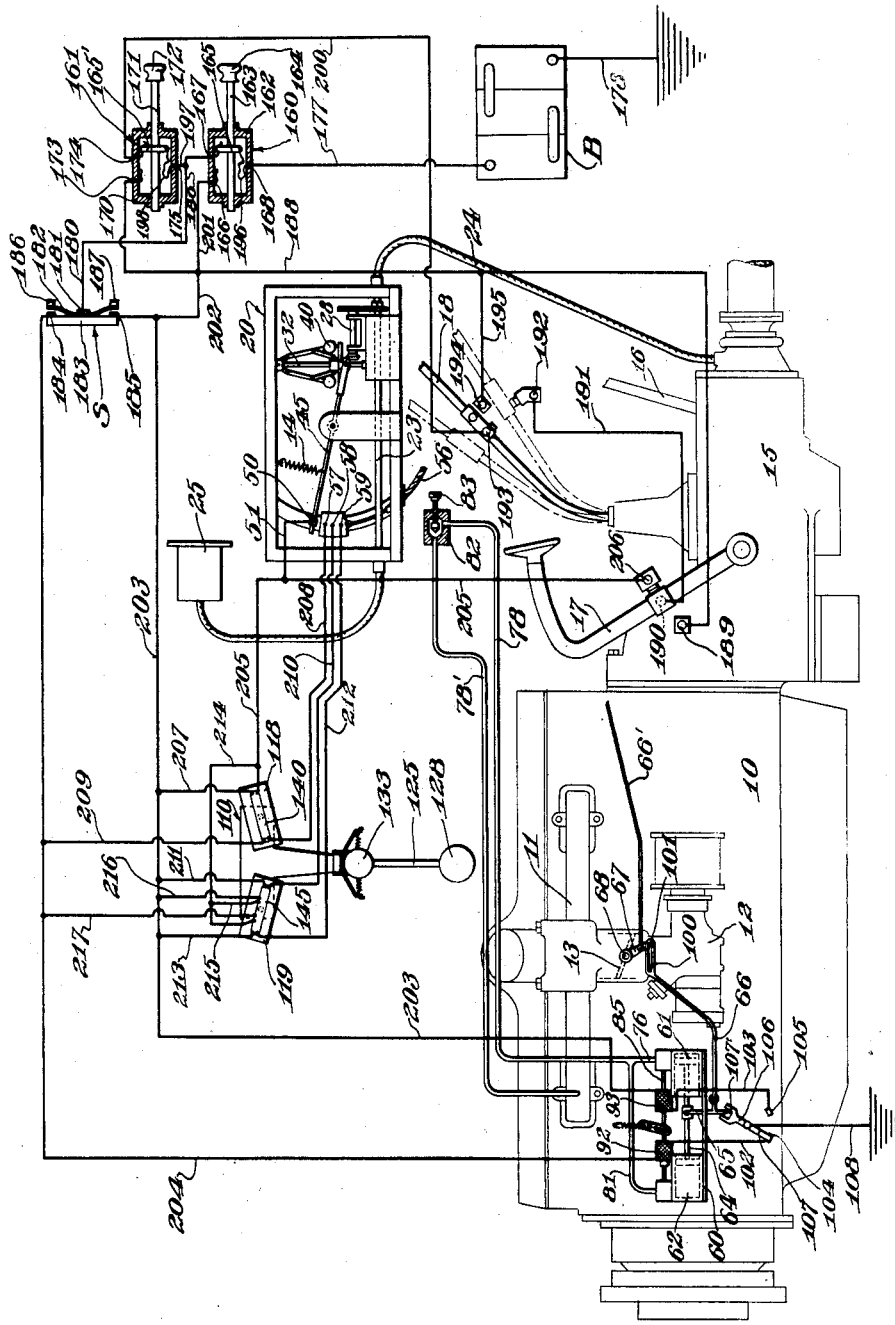

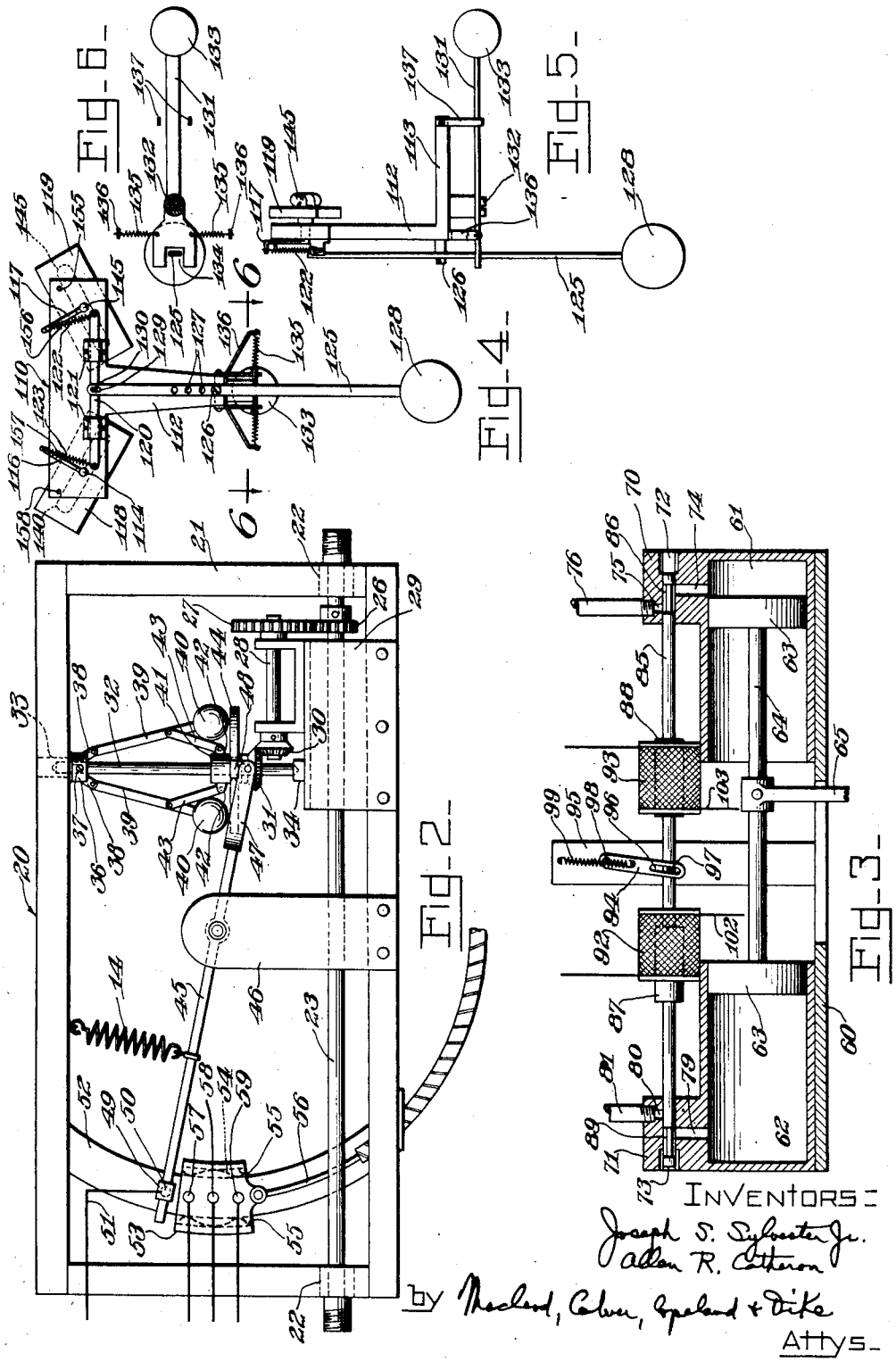

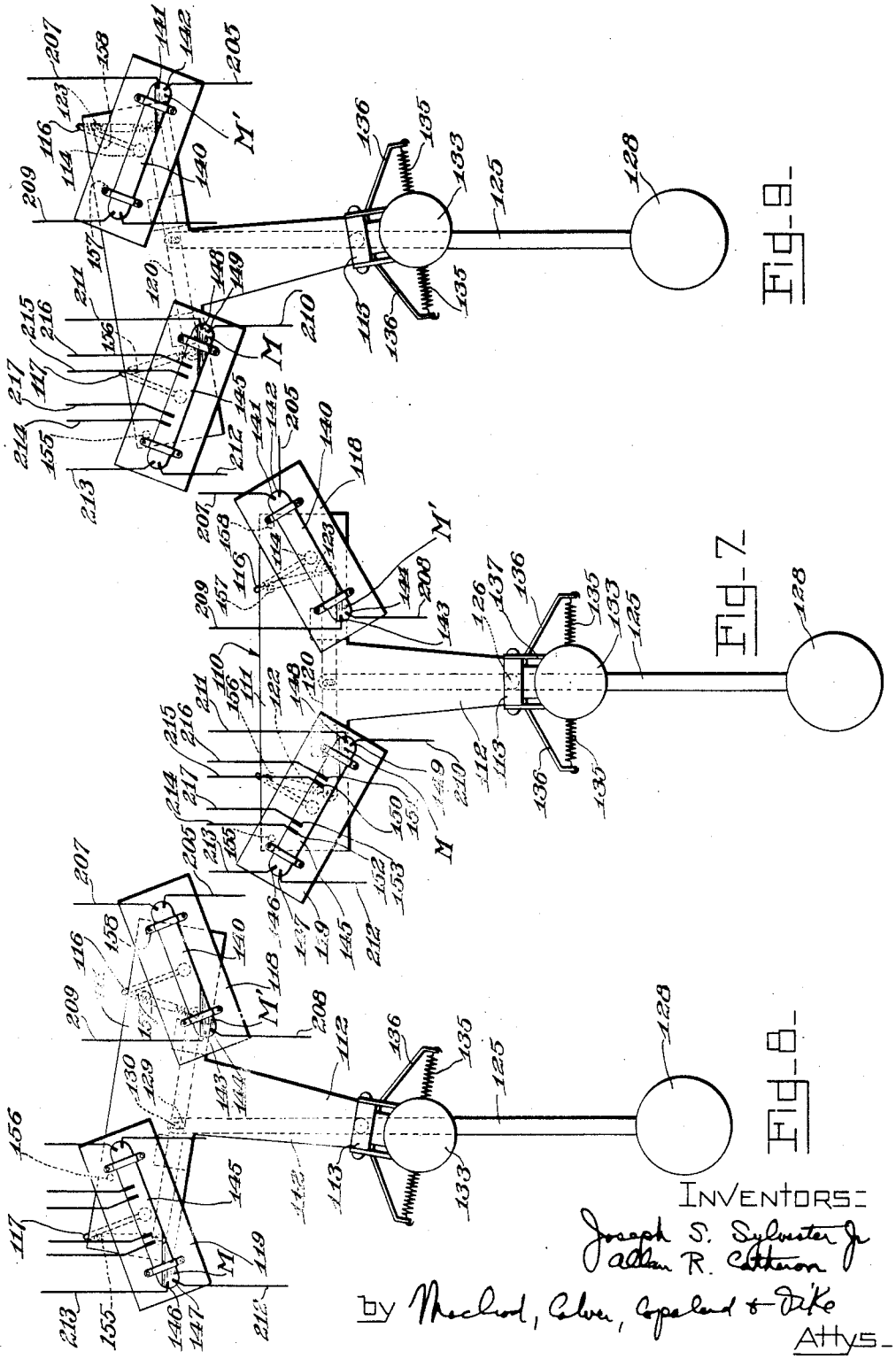

Patented Feb. 5, 1935

1,990,354

UNITED STATES PATENT OFFICE 1,990,354

SPEED CONTROL SYSTEM FOR AUTOMOBILES

Joseph S. Sylvester, Jr., Hanover, and Allan R. Catheron, Needham, Mass., assignors of one-third to Joseph A. Locke, Boston, Mass.

Application May 10, 1933, Serial No. 670,300

2 Claims. (Cl. 180—54)

The invention contemplates the provision of apparatus adapted to be embodied in a motor vehicle to obtain maximum efficiency of operation of the motor. The apparatus comprises, in general, a governor unit controlled by the speed of the vehicle and a unit controlled by the governor to control the speed and power of the motor, as by opening the throttle valve when the speed of the vehicle falls to a predetermined minimum and closing the throttle valve to cause the motor to idle when the speed of the vehicle reaches a predetermined maximum. The apparatus is arranged for adjustment so that the speed of the vehicle may be maintained at approximately any desired speed.

The apparatus of the invention is particularly advantageous for use in motor vehicles equipped to be driven in free wheeling although, obviously, it is not limited to such use. When a motor vehicle is operated in free wheeling, it is accelerated to a desired speed and the throttle then closed to the position of idling speed by removing the foot from the accelerator. Since the free wheeling device is an automatic clutch, it disengages the engine when idling and allows the vehicle to coast freely with no braking effect from the engine. When the vehicle loses speed, opening the throttle reengages the engine and accelerates the vehicle.

The invention will be more clearly understood from the following description in conjunction with the accompanying drawings: in which, Fig. 1 is a diagrammatic view of a portion of the motor vehicle embodying the invention;

Figs. 2, 3 and 4 are detail elevational views of different portions of the apparatus of the invention, Fig. 3 being partly in section;

Figs. 5 and 6 are detail side elevational and plan views respectively of the portion of the apparatus shown in Fig. 4; and Figs. 7, 8 and 9 are enlarged elevational views of the portion of the apparatus shown in Fig. 4 looking from the opposite side thereof.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the accompanying drawings a portion of a motor vehicle embodying the invention is illustrated comprising an internal combustion engine 10 having the usual intake manifold 11 operatively associated with a carburetor 12 having a throttle valve 13. The motor 10 has associated therewith the usual transmission 15 which may embody a free wheeling unit controlled by a lever 16. A gear shift lever 18 is provided for controlling the transmission. The usual brake operating lever 17 is operatively connected with the vehicle brakes (not shown).

In accordance with the invention a governor unit 20 is suitably mounted upon the vehicle and comprises a frame 21 having bearings 22 in which a shaft 23 is mounted for rotation. The shaft 23 is interposed in and forms a part of the transmission drive member 24 for the speedometer 25. The shaft 23 is provided with a gear 26 meshing with a gear 27 carried by a shaft 28 mounted in suitable bearings in a bracket 29 suitably fixed in the frame 21. The shaft 28 is provided with a bevel gear 30 meshing with a bevel gear 31 fixed upon the governor shaft 32 which is mounted for rotation in suitable bearings 33 and 34 in the frame 21 and bracket 29 respectively. A collar 36 is fixed upon the shaft 32, as by a set screw 37, and is provided with a pair of ears 38 to each of which one end of an arm 39 is pivotally connected. The other end of each of the arms 39 carries a weight, such as a ball 40. A sleeve 41 is slidably mounted upon the shaft 32 and is provided with a pair of ears 42 to which one end of links 43 are pivotally mounted. The other ends of the links 43 are pivotally connected to the arms 39 at an intermediate point thereof. A disk 44 having depending ears 48 surrounds the sleeve 41 and has a sliding fit in a groove therein.

An arm 45 is pivotally mounted at an intermediate point upon a bracket 46 suitably secured upon the frame 21 and is provided with a forked end 47 which straddles the disk 44 and has its free ends pivotally connected to the ears 48 depending from the disk. A spring 14 tends to urge the arm 45 in a clockwise direction. An insulated block 49 is suitably mounted upon the other end of the arm 45 and is provided with an electrical contact 50 which is connected with a lead 51. An arc shaped support 52 is suitably secured in the frame 21 adjacent the contact 50 carried by the arm 45. A slide 53 is adjustably mounted upon the support 52 and is held in any desired adjusted position thereon by springs 54 interposed between shoulders 55 on the slide and the edges of the support. The slide 53 is suitably connected to one end of a Bowden wire 56, the other end of which terminates at a point easily accessible to the driver of the vehicle and adjacent an indicator (not shown) so that he may adjust the slide to any desired position as explained hereinafter. The slide 53 contains a plurality of electrical contacts 57, 58 and 59 positioned thereon in spaced relation in suitable insulation.

The unit for controlling the motor 10 comprises a bracket 60 suitably mounted adjacent the motor. The bracket 60 carries a pair of aligned cylinders 61 and 62 each having a piston 63 connected by a common piston rod 64. An arm 65 is suitably secured at one end to the piston rod 64 and pivotally supports one end of a link 66, the other end of which is provided with a slot 100 embracing a pin 101 upon the free end of an arm 67 fixed upon the throttle valve shaft 68. A manually operable rod 66' also is pivotally connected to the arm 67 for manually operating the throttle. The walls of the cylinders 61 and 62 are provided with enlargements 70 and 71 respectively providing valve chambers 72 and 73 respectively. The enlargement 70 is provided with a passage 74 connecting the valve chamber 72 with the interior of the cylinder 61 and is also provided with a threaded passage 75 communicating with the valve chamber 72 and adapted to receive one end of a conduit 76, the other end of which is connected to a conduit 78. The enlargement 71 is provided with a passage 79 providing communication with the valve chamber 73 and the interior of the chamber 62 and it is provided with a threaded passage 80 communicating with the valve chamber 73 and adapted to receive one end of a conduit 81, the other end of which is connected to the conduit 78. The conduit 78 communicates with a valve chamber 82 positioned at a point conveniently accessible to the driver of the vehicle. A conduit 78' provides communication between the valve chamber 82 and the intake manifold 11. A valve member 83 is adjustably mounted in the valve chamber 82 and may be adjusted to restrict communication between conduits 78 and 78'.

A valve rod 85 extends between and is slidably mounted in the valve chambers 72 and 73. The end of the rod 85 within the chamber 72 is provided with an annular groove 86 while the end of the rod 85 within the chamber 73 is provided with an annular groove 89. The grooves 86 and 89 together with the portions of the valve rod adjacent thereto provide valves for controlling communication between the intake manifold and the cylinders 61 and 62. The valve rod 85 is moved axially to operate the valves by a pair of solenoids 92 and 93 which surround enlarged portions 87 and 88, respectively, of the rod and form part of an electrical system for controlling the valves and which is controlled by the governing unit 20.

A lever 94 is pivotally mounted at one end upon a stud 98 in an upright portion 95 of the bracket 60. A slot 96 is provided in the lever 94 near its other end and embraces a pin 97 fixed in the rod 85 at a point midway between adjacent edges of the enlargements 87 and 88. A spring 99 is fixed at one end at an intermediate point on the lever 94 and is fixed at its other end to the upright 95 at a point equidistant from the solenoids 92 and 93. The adjacent ends of the windings of the solenoids 92 and 93 are connected by leads 102 and 103 to contacts 104 and 105 respectively. A switch arm 106 carrying a suitably insulated contact 107 is pivotally mounted so that it may be swung to bring the contact 107 in engagement with either of the contacts 104 or 105. The arm 106 is forked as at 107' to embrace the free end of the arm 65. A grounded lead 108 is connected to the contact 107.

In the embodiment of the invention illustrated, a special type of mercury switch mechanism forms part of the electrical system controlled by the governing unit 20. This switch mechanism comprises a standard 110 adapted to be mounted on a stationary part of a vehicle in a substantially vertical plane. The standard 110 comprises an elongated portion 111 arranged to extend horizontally when the vehicle is on a horizontal surface and an elongated portion 112 depending therefrom and substantially perpendicular thereto. The standard 110 also is provided with a portion 113 extending perpendicular to the general vertical plane thereof from the lower end of the portion 112. Shafts 114 and 115 are rotatably mounted in suitable bearings near opposite ends of the portion 111 and are provided at one end with crank arms 116 and 117, respectively. Blocks 118 and 119 are fixed upon the other ends of the shafts 114 and 115, respectively, and normally rest in oppositely inclined positions. A slide 120 is slidably mounted in suitable guides 121 upon the standard portion 111 and its length is less than the distance between the shafts 114 and 115. One end of a spring 122 is connected to the end of the crank 117 and its other end is connected to the adjacent end of the slide 120. One end of a spring 123 is connected to the other end of the slide 120 and its other end is connected to the end of the crank 116. A pendulum 125 is pivotally mounted upon a stud 126 fixed in the standard 112 and passing through one of the bearings 127 in the pendulum 125. The pendulum 125 is adapted to swing in a substantially vertical plane and is provided at its lower end with a weight 128. The other end of the pendulum is provided with a slot 129 embracing a pin 130 fixed in the slide 120 at a point midway between the ends thereof. Spaced stops 155 and 156 are fixed in the standard 111 near one end thereof to limit the range of movement of the crank 117 and spaced stops 157 and 158 are fixed near the other end of the standard 111 to limit the range of movement of the crank 116.

A pendulum 131 is pivotally mounted upon a stud 132 fixed in the standard 113 to swing in a plane perpendicular to the pendulum 125. One end of the pendulum 131 is provided with a weight 133 and its other end is provided with a fork 134, the sides of which embrace the pendulum 125 but are normally spaced therefrom. Springs 135 are secured at one end to opposite sides of the forked end 134 of the pendulum 131 and extend in opposite directions therefrom and are secured at their other ends to arms 136 extending from the standard 110. Arms 137 depend from opposite sides of the standard 113 so as to limit the range of movement of the pendulum 131.

A tube 140 containing a small volume of mercury M' is suitably secured upon the block 118 and is positioned thereon as illustrated with its axis parallel to the longitudinal axis of the block. The outer end of the tube 140 is provided with spaced electrical contacts 141 and 142 while the other end of the tube is provided with spaced contacts 143 and 144. A tube 145 containing a small volume of mercury M is suitably secured upon the block 119 and is positioned thereon as illustrated with its axis parallel to the longitudinal axis of the block. The tube 145 is provided at its outer end with spaced contacts 146 and 147 and at its other end with spaced contacts 148 and 149. Spaced contacts 150 and 151 are positioned intermediate the ends of the tube 145. Contacts 152 and 153 are also provided in the tube 145 between its outer end and the contacts 150 and 151.

The electrical system also includes a main switch 160 and a governor switch 161. The main switch 160 comprises a switch box 162 of cylindrical form having closed ends provided with suitable bearings for slidably receiving a rod 163 having an operating knob 164 suitably fixed upon the end thereof. A contact 165 is secured in suitable insulation upon the rod 163 and contacts 166, 167 and 168 are fixed in suitable insulation in the box 162. The governor switch 161 is of similar construction and comprises a switch box 170 of cylindrical form closed at its ends. The ends are provided with suitable bearings for slidably receiving a rod 171 having an operating knob 172 suitably fixed upon the end thereof. Contacts 173, 174 and 175 are fixed in suitable insulation in the box 170 and a contact 165' is secured in suitable insulation upon the rod 171.

A manually operable switch S conveniently accessible to the driver of the vehicle is provided in the electrical circuit between the main switch 160 and the solenoids 92 and 93. The switch S comprises an insulated base 183 having contacts 184 and 185 positioned at opposite ends thereof. A resilient switch arm 182 of electrical conducting material is suitably fixed at an intermediate point to the base 183 by means providing a contact 181. Insulated buttons 186 and 187 are mounted at opposite ends of the arm 182 so that the ends of the arm may be moved manually, when desired, in engagement with the contacts 184 or 185.

The contact 168 of the main switch 160 is connected by a lead 177 to one terminal of a battery B, the other terminal of which is connected to a grounded lead 178. The terminal 167 of the main switch is connected by a lead 180 to the contact 181 on the resilient switch arm 182. The contact 173 of the governor switch 161 is connected by a lead 188 to a contact 189 mounted in an insulated block suitably positioned adjacent the brake lever 17 and is adapted to be engaged by a contact 190 in an insulated block carried by the brake lever 17 during the operation of applying the brakes. The contact 190 is adapted to engage an insulated contact 206 when the brake lever 17 is in its inoperative position. The contact 190 is connected by a lead 191 to a contact 192 mounted in an insulated block suitably positioned adjacent the shift lever 18 so as to be engaged by a contact 193 in an insulated block carried by the shift lever when the latter is positioned for driving the car in high speed. A contact 194 in an insulated block is suitably positioned adjacent the shift lever 18 so as to be engaged by the contact 193 when the shift lever is moved from one position to another and is connected by a lead 195 to the lead 188. The contacts 165 and 168 are connected by a lead 196. The contact 175 is connected by a lead 197 to the lead 180. The contact 175 is also connected by a lead 198 with the contact 165'. The contact 174 is connected by a lead 200 with the contact 193. The contact 166 is connected by a lead 201 with the lead 188 and the latter is connected by a lead 202 with the contact 185.

The lead 202 is connected by a lead 203 with the solenoid 93. The contact 184 is connected by a lead 204 with the solenoid 92. The lead 51 is connected to a lead 205 which connects the contact 142 with the contact 206. The contact 141 is connected by a lead 207 with the lead 203. The contact 57 is connected by a lead 208 with the contact 144 and the contact 143 is connected by a lead 209 with the lead 204. The contact 58 is connected by a lead 210 with the contact 149 while the contact 148 is connected by a lead 211 with the lead 203. The contact 59 is connected by a lead 212 with the contact 147 while the contact 146 is connected by a lead 213 with the lead 203. The contact 152 is connected by a lead 214 with the lead 205. The contact 150 is connected by a lead 215 with the lead 214. The contact 151 is connected by a lead 216 with the lead 203 and the contact 153 is connected by a lead 217 to the lead 204.

When the vehicle is operated over a level or horizontal surface, the parts of the mercury switch mechanism are positioned as shown in Figs. 4 to 7 inclusive with the cranks 116 and 117 engaging the stops 157 and 156 respectively and the blocks 118 and 119 oppositely inclined so that the mercury M connects the contacts 148 and 149 and the mercury M' connects the contacts 143 and 144. If the vehicle is suddenly accelerated or decelerated, there is a tendency for the pendulum 125 to swing and rock one or the other of the blocks 118 or 119 to cause the mercury M to move out of engagement with the contacts 148 and 149 or the mercury M' to move out of engagement with the contacts 143 or 144. However, when the vehicle is accelerated or decelerated, the pendulum 131 likewise tends to swing and inasmuch as the forked end 134 of the pendulum 131 embraces the pendulum 125 it exerts a force upon the latter opposing its movement. It will be understood that the pendulum 131 cooperates with the pendulum 125 in this manner not only when the vehicle is travelling upon a level surface but also when it is travelling up or down grade.

When the vehicle ascends a grade the standard 111 assumes a position similar to that shown in Fig. 8 inasmuch as it is positioned parallel to the surface upon which the vehicle is travelling. At the same time the pendulum 125 remains vertical causing the slide 120 to be moved to the left as viewed in Fig. 8 an amount sufficient to move the spring 122 from the position shown in Fig. 7 to that shown in Fig. 8 thereby causing it to swing the crank 117 out of engagement with the stop 156 and into engagement with the stop 155 and tip the block 119 from the position shown in Fig. 7 to that shown in Fig. 8. In so doing the mercury M moves from the inner end of the tube 145 to the outer end thereof, first connecting the contacts 150 and 151 and then connecting the contacts 152 and 153 and finally connecting the contacts 146 and 147. It will be noted that the block 118 remains in the same position relative to the standard 111 when the vehicle is moving upgrade as when moving along the level.

If, however, the vehicle now should start to descend a grade, the slide 120 is moved to the right as viewed in Figs. 7, 8 and 9 thereby causing the ends thereof to move to such positions as to cause the springs 123 and 122 to swing the cranks 116 and 117 into engagement with the stops 158 and 156 respectively, thereby moving the blocks to the inclined positions shown in Fig. 9. This movement of the blocks causes mercury M to move out of engagement with the contacts 146 and 147, first into engagement with the contacts 152 and 153, then in engagement with the contacts 150 and 151 and finally in engagement with the contacts 148 and 149 and causes the mercury M' to move out of engagement with the contacts 143 and 144 and into engagement with the contacts 141 and 142.

The arrangement of the electrical system is such that when the solenoid 92 is energized the rod 85 is moved to the right, as viewed in Figs. 1 and 3, to cause the annular groove 89 to register with the passages 79 and 80 thereby providing communication between the interior of the cylinder 62 and the intake manifold 11. The aforesaid movement of the rod 85 brings the annular groove 86 into registry with the enlargement of the valve chamber 72 thereby providing direct communication between the atmosphere and the interior of the cylinder 61. Consequently, the piston within the cylinder 61 is subjected to atmospheric pressure on both sides thereof while the piston within the cylinder 62 is subjected to atmospheric pressure upon one side and upon its other side to the manifold depression, causing the pistons and the arm 65 to move toward the left as viewed in Figs. 1 and 3 to move the throttle valve 13 in a clockwise direction to open the same gradually to increase the speed and power of the motor. When the solenoid 93 is energized the rod 85 is moved to the left to bring the annular groove 86 into registry with the passages 74 and 75 thereby providing communication between the interior of the cylinder 61 and the intake manifold. At the same time the annular groove 89 is brought into registry with the enlargement of the valve chamber 73 thereby providing direct communication between the atmosphere and the interior of the chamber 62. Consequently, the piston within the cylinder 62 is subjected to atmospheric pressure on both sides thereof while the piston within the cylinder 61 is subjected to atmospheric pressure upon one side and on its other side to manifold depression thereby causing the pistons and rod 66 to move to the right and permit the throttle valve 13 to be moved in a counterclockwise direction to close the same. This action being caused by the usual spring (not shown) acting to maintain the throttle valve closed. It will be understood that the rate at which the throttle valve is opened and closed as above described can be regulated by adjusting the valve member 83 to vary the constriction between the conduits 78 and 78'. It will be understood that as soon as energization of either solenoid 92 or 93 has caused the rod 85 to move to bring the spring 99 past one side of the stud 98, which form the dead center, the spring 99 will cause the desired movement of the rod 85 even if the solenoids become deenergized before the desired movement of the rod 85 is completed.

When it is desired to drive the vehicle at approximately a predetermined speed, the operator moves the Bowden wire 56 to set the slide 53 at a desired position depending upon the approximate speed which it is desired to maintain as will be understood from the following description. It will be assumed that the motor for propelling the vehicle is idling. The operator now moves the rods 163 and 171 of the switches 160 and 161 respectively so as to bring the contact 165 in engagement with the contact 167 and to bring the contact 165' into engagement with the contact 174. The operator now starts the vehicle in motion in the usual manner through the various speed ratios. When the shift lever 18 is positioned in its final or high speed position, the contact 193 engages the contact 192. As the operator continues to accelerate the vehicle, the arm 45 of the governing unit 20 moves counterclockwise until the contact 50 carried thereby engages the contact 57. When the vehicle is running over a level or horizontal surface the parts of the mercury switch mechanism will be positioned as shown in Fig. 7 and the circuit from the battery B is completed through the leads 177, contact 165, leads 180 and 197, contacts 175, 165' and 174, lead 200, contacts 193 and 192, lead 191, contacts 190 and 206, leads 205, and 51, contacts 50 and 57, lead 208, contact 144, mercury M', contact 143 and leads 209 and 204 to the solenoid 92 and thence through the lead 102, contacts 104 and 107 and the grounded lead 108. As the rod 64 is moved in response to actuation of the solenoid 92, the arm 65 causes the switch arm 106 to swing to move contact 107 out of engagement with the contact 104 and into engagement with the contact 105 thereby opening the circuit so as to economize the energy supplied from the battery B.

Thus, the throttle valve 13 is opened and the vehicle continues to accelerate and the arm 45 continues to move in a counterclockwise direction until the contact 50 engages the contact 58 whereupon the current is supplied from the battery through the lead 210, contact 149, mercury M, contact 148, leads 211 and 203, and solenoid 93 and thence through lead 103, contacts 105 and 107 and grounded lead 108 thereby causing the throttle 13 to close and the switch arm 106 to swing and move contact 107 out of engagement with the contact 105 and into engagement with the contact 104. The vehicle then will gradually decelerate and the arm 45 will move in a clockwise direction and finally bring the contact 50 into engagement with the contact 57 to again close the circuit through the solenoid 92 to open the throttle valve as previously explained.

By adjusting the slide 53, the contact 57 may be positioned to be engaged by the contact 50 at any desired vehicle speed. The contacts 58 and 59 are positioned upon the slide 53 so as to be engaged by the contact 50 at predetermined greater speeds of the vehicle. Thus, for example, if the slide 53 is positioned so that the contact 57 is engaged by the contact 50 at a vehicle speed of 35 M. P. H., the contacts 58 and 59 may be so spaced from the contact 57 as to be engaged by the contact 50 at vehicle speeds of 40 and 45 M. P. H. respectively.

If for any reason, it is desired to come to a sudden stop or to decelerate the vehicle to any extent while the throttle valve is in its open position, the operator merely steps upon the brake pedal in the usual manner. In so doing the contact 190 is brought into engagement momentarily with the contact 189 thereby supplying current from the battery through the leads 188, 202 and 203 to the solenoid 93 to move the rod 66 and permit the throttle to close.

If the vehicle ascends a grade the mercury switch mechanism will be actuated so that its parts are moved relatively from the position shown in Fig. 7 to that shown in Fig. 8. When the parts are moving from the positions shown in Fig. 7 to the positions shown in Fig. 8, the mercury M momentarily engages the contacts 150 and 151 thereby closing the circuit from the battery through the leads 216 and 203 to the solenoid 93 to close the throttle if it is not already closed. Thereafter, the mercury M momentarily engages the contacts 152 and 153 to close the circuit from the battery through the leads 217 and 204 to the solenoid 92 to open the throttle if it is not already open. When the parts are in the positions shown in Fig. 8 and when the contact 50 engages the contact 57, current will be supplied through lead 208, contact 144, mercury M', contact 143 and thence through the leads 209 and 204 to the solenoid 92 to open the throttle. It will be noted that the mercury M now connects the contacts 146 and 147. Consequently, as the vehicle accelerates and the contact 50 engages the contact 58, the throttle valve 13 remains open inasmuch as there is no electrical connection between the contacts 148 and 149. Therefore, the vehicle will continue to accelerate until the contact 50 engages the contact 59 whereupon the circuit is closed through the lead 212, contact 147, mercury M, contact 146 and leads 213 and 203 to the solenoid 93 to permit the throttle 13 to close.

When the vehicle again reaches a level or horizontal surface, the parts are moved from the positions shown in Fig. 8 to the positions shown in Fig. 7. In so moving, the mercury M first momentarily engages the contacts 152 and 153 to close the circuit from the battery through the leads 217 and 204 to the solenoid 92 to open the throttle if it is not already open. Thereafter, the mercury M momentarily engages the contacts 150 and 151 to close the circuit from the battery through the leads 216 and 203 to the solenoid 93 to close the throttle if it is not already closed.

If the vehicle now starts to descend a grade, the parts of the mercury switch mechanism assume the positions as shown in Fig. 9 wherein it will be noted that the mercury M connects the contacts 148 and 149 and the mercury M' connects the contacts 141 and 142. If, when this takes place, the throttle 13 happens to be open, it will be closed immediately inasmuch as the circuit from the battery B will now be closed through the switches 160 and 161, leads 200, 191 and 205, contact 142, mercury M', contact 141, leads 207 and 203 and solenoid 93. Or if the contact 50 happened to be in engagement with the contact 58, the circuit would also be closed through the lead 210, contact 149, mercury M, contact 148 and lead 211 which is connected by the lead 203 to the solenoid 93.

If the shift lever 18 is moved from its final or high-speed position to any other position, the contact 193 carried thereby is brought into engagement with the contact 194 momentarily thereby completing the circuit from the battery B through the switches 160 and 161 and lead 200 and thence through contacts 193 and 194 to leads 195, 188, 202 and 203 to the solenoid 93 to permit the throttle to close if it is not already in closed position.

If it is desired to render the governor unit inoperative, the rod 171 of the switch 161 is moved to the extreme left as viewed in Fig. 1. In so doing the contact 165' momentarily engages the contact 173 thus closing the circuit through the leads 188, 202 and 203 to the solenoid 93 to permit the throttle to close if it is not already in closed position. The vehicle may then be operated in the usual manner by manually actuating the accelerator. However, the closing and opening of the throttle may be controlled by the manual operation of the switch S. Thus, if it is desired to open the throttle the operator presses upon the button 186 to bring the switch arm 182 into engagement with the contact 184 thereby closing the circuit from the battery B through the switch 160 and thence through lead 180, switch arm 182 and lead 204 to the solenoid 92. If it is desired to close the throttle, the operator engages the button 187 to bring the switch arm 182 into engagement with the contact 185 momentarily, thereby closing the circuit from the battery through the switches 160 and S and thence through the leads 202 and 203 to the solenoid 93.

If it is desired to render the automatic throttle control inoperative, the rod 163 is moved to the extreme left as viewed in Fig. 1. In so doing the contact 165 momentarily engages the contact 166 thus closing the circuit through the leads 201, 202 and 203 to the solenoid 93 to permit the throttle to close if it is not already closed. The vehicle may then be operated in the usual manner by manually actuating the accelerator.

The apparatus of the invention maintains a desired average speed with the least possible use of the engine. Since its operation depends upon certain definite speed variations of the motor vehicle itself, it is found more accurate than any human driver could be. The engine is turned on only when the speed of the car falls below a certain desired minimum and is instantly shut off whenever the car has attained sufficient momentum to carry it forward at the desired average speed without help from the engine. The apparatus is not affected by road shocks or vibrations as is the human foot. There is no lag in its operation. The throttle is opened slowly but evenly with no halts as when operated manually by the driver. Since the carburetor control is at the constant dictate of the governor unit, the engine is turned on and off at all times regardless whether the variation and necessity would be obvious and apparent to the driver of the vehicle. Tests over a given course have proved that in the use of the apparatus the engine is used less and the gas consumption is less for maintaining a given desired speed and that a higher average speed is maintained with a lower maximum. Physical effort in operating the foot accelerator pedal is avoided by the use of apparatus embodying the invention.

What we claim is:

1. In a motor vehicle having a motor, and a final drive, in combination, a governor responsive to the speed of the vehicle, means for controlling the motor including a fluid operated device, a conduit for supplying fluid to said device having an adjustable valve for restricting the flow of fluid therethrough, and electrically actuated means controlled by said governor for controlling said fluid operated device to reduce the speed and power of the motor to a predetermined minimum when the speed of the vehicle reaches a predetermined maximum, and for increasing the speed and power of the motor to a predetermined maximum when the speed of the vehicle is reduced to a predetermined minimum.

2. In a motor vehicle having a motor, and a final drive, in combination, a governor responsive to the speed of the vehicle, means for controlling the motor including a fluid operated device, a conduit for supplying fluid to said device having an adjustable valve for restricting the flow of fluid therethrough, electrically actuated means controlled by said governor for controlling said fluid operated device to reduce the speed and power of the motor to a predetermined minimum when the speed of the vehicle reaches a predetermined maximum, and for increasing the speed and power of the motor to a predetermined maximum when the speed of the vehicle is reduced to a predetermined minimum, said electrically actuated means including a switch, and operative connections between said switch and fluid operated device whereby actuation of the latter actuates the former.

JOSEPH S. SYLVESTER, Jr.
ALLAN R. CATHERON.